United States Patent
Liu et al.

(10) Patent No.: US 11,528,637 B2
(45) Date of Patent: Dec. 13, 2022

(54) METHOD AND APPARATUS FOR WIRELESS COMMUNICATION

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 13 days.

(21) Appl. No.: 16/651,361

(22) PCT Filed: Aug. 30, 2018

(86) PCT No.: PCT/CN2018/103262
§ 371 (c)(1),
(2) Date: Mar. 27, 2020

(87) PCT Pub. No.: WO2019/062461
PCT Pub. Date: Apr. 4, 2019

(65) Prior Publication Data
US 2020/0275308 A1  Aug. 27, 2020

(30) Foreign Application Priority Data
Sep. 28, 2017  (WO) ................ PCT/CN2017/103977

(51) Int. Cl.
*H04W 28/02*  (2009.01)
*H04L 1/18*  (2006.01)
(Continued)

(52) U.S. Cl.
CPC ....... *H04W 28/0278* (2013.01); *H04L 1/1812* (2013.01); *H04L 47/283* (2013.01);
(Continued)

(58) Field of Classification Search
None
See application file for complete search history.

(56) References Cited

U.S. PATENT DOCUMENTS

2013/0089057 A1  4/2013  Worrall et al.
2015/0230248 A1  8/2015  Kim et al.
(Continued)

FOREIGN PATENT DOCUMENTS

CN   101932019 A   12/2010
CN   102291200 A   12/2011
(Continued)

OTHER PUBLICATIONS

International Search Report and Written Opinion for International Application No. PCT/CN2018/103262, dated Nov. 22, 2018, 9 pages.
(Continued)

*Primary Examiner* — Kouroush Mohebbi
(74) *Attorney, Agent, or Firm* — Nicholson De Vos Webster & Elliott LLP

(57) ABSTRACT

Method and apparatus for wireless communication. The method comprises determining respective buffer size tables for at least one logical channel group (LCG) based on at least one reference buffer size (BS) table; generating the BSR for the at least one LCG based on the respective buffer size tables; and transmitting the BSR to a network device, wherein the network device configures a terminal device with the at least one LCG.

16 Claims, 9 Drawing Sheets

(51) Int. Cl.
  *H04L 47/283* (2022.01)
  *H04W 72/04* (2009.01)
  *H04W 72/12* (2009.01)

(52) U.S. Cl.
  CPC ... *H04W 72/0413* (2013.01); *H04W 72/1242* (2013.01); *H04W 72/1284* (2013.01)

(56) References Cited

U.S. PATENT DOCUMENTS

2019/0053260 A1* 2/2019 Shaheen ............ H04W 28/0278
2019/0335357 A1* 10/2019 Shi .................... H04W 28/0252

FOREIGN PATENT DOCUMENTS

| CN | 102984659 A | 3/2013 |
|---|---|---|
| CN | 106105304 A | 11/2016 |
| CN | 106105305 A | 11/2016 |
| CN | 106714213 A | 5/2017 |
| EP | 3688902 A1 | 8/2020 |
| WO | 2019/062461 A1 | 4/2019 |

OTHER PUBLICATIONS

International Preliminary Report on Patentability for International Application No. PCT/CN2018/103262, dated Jan. 16, 2020, 5 pages.
Ericsson, "BSR formats in NR," Aug. 21-25, 2017, 4 pages, 3GPP TSG-RAN WG2 #99, Tdoc R2-1708349, Beriin, Germany.
"3rd Generation Partnership Project; Technical Specification Group Radio Access Network; Evolved Universal Terrestrial Radio Access (E-UTRA); Physical layer procedures (Release 13)," Dec. 2015, 326 pages, 3GPP TS 36.213, V13.0.0, 3GPP Organizational Partners.
European Search Report and Search Opinion, EP App. No. 18861011.7, dated Oct. 22, 2020, 9 pages.
Huawei et al., "Design Principle of BS Table", 3GPP TSG-RAN WG2 #99, R2-1707724, Aug. 21-25, 2017, 5 pages.
Qualcomm Incorporated, "On BSR Formats", 3GPP TSG-RAN WG2 Meeting RAN2 #99, R2-1709122 (updated R2-1706521), Aug. 21-25, 2017, 3 pages.
Sharp, "BSR Enhancements with Multiple Numerologies", 3GPP TSG-RAN2 Meeting #99, R2-1710241, Aug. 21-24, 2017, 4 pages.
Huawei, "UE Behaviour of NAS Message Transmission when Inter-RAT Change", 3GPP TSG-RAN WG2 #63, Aug. 18-22, 2008, R2-084430, 8 pages.
Intel Corporation, "BSR Enhancements", 3GPP TSG RAN WG2 Meeting NR Ad hoc, R2-1707025, Jun. 27-29, 2017, 6 pages.
Notice of Reasons for Refusal, JP App. No. 2020-512462, dated Jun. 21, 2021, 7 pages (4 pages of English Translation and 3 pages of Original Document).
Samsung, "Discussion on BSR format", 3GPP TSG-RAN WG2 NR Ad-hoc#2 Meeting, R2-1707381, Jun. 27-29, 2017, 6 pages.
Examiner Requisition, CA App. No. 3,077,132, dated May 20, 2021, 5 pages.
Grant for KR Application No. 10-2020-7008647 dated Sep. 29, 2021, 2 pages (1 page of English Translation and 1 page of Original Document).
Notification of Reason for Refusal for KR Application No. 10-2020-7008647 dated Mar. 18, 2021, 8 pages (4 pages of English Translation and 4 pages of Original Document).
LG Electronics Inc., "BSR format with increased LCG", 3GPP TSG-RAN WG2 Meeting NR AH#2, R2-1707222, Jun. 27-29, 2017, 5 pages.
Motorola, "MAC BSR Coding", 3GPP TSG-RAN WG2 Meeting #63, R2-084420, Aug. 18-22, 2008, 8 pages.
Notice of Reasons for Refusal, JP App. No 2020-512462, Dec. 28, 2021, 7 pages (3 pages of English Translation and 4 pages of Original Document).
Office Action, CN App. No. 201880062587.5, Dec. 24, 2021, 10 pages of Original Document Only.
Communication pursuant to Article 94(3) EPC, EP App. No. 18861011, dated Oct. 13, 2022, 4 pages.

\* cited by examiner

| Index | Buffer Size (BS) value [bytes] | Index | Buffer Size (BS) value [bytes] |
|---|---|---|---|
| 0 | BS = 0 | 32 | 1132 < BS <= 1326 |
| 1 | 0 < BS <= 10 | 33 | 1326 < BS <= 1552 |
| 2 | 10 < BS <= 12 | 34 | 1552 < BS <= 1817 |
| 3 | 12 < BS <= 14 | 35 | 1817 < BS <= 2127 |
| 4 | 14 < BS <= 17 | 36 | 2127 < BS <= 2490 |
| 5 | 17 < BS <= 19 | 37 | 2490 < BS <= 2915 |
| 6 | 19 < BS <= 22 | 38 | 2915 < BS <= 3413 |
| 7 | 22 < BS <= 26 | 39 | 3413 < BS <= 3995 |
| 8 | 26 < BS <= 31 | 40 | 3995 < BS <= 4677 |
| 9 | 31 < BS <= 36 | 41 | 4677 < BS <= 5476 |
| 10 | 36 < BS <= 42 | 42 | 5476 < BS <= 6411 |
| 11 | 42 < BS <= 49 | 43 | 6411 < BS <= 7505 |
| 12 | 49 < BS <= 57 | 44 | 7505 < BS <= 8787 |
| 13 | 57 < BS <= 67 | 45 | 8787 < BS <= 10287 |
| 14 | 67 < BS <= 78 | 46 | 10287 < BS <= 12043 |
| 15 | 78 < BS <= 91 | 47 | 12043 < BS <= 14099 |
| 16 | 91 < BS <= 107 | 48 | 14099 < BS <= 16507 |
| 17 | 107 < BS <= 125 | 49 | 16507 < BS <= 19325 |
| 18 | 125 < BS <= 146 | 50 | 19325 < BS <= 22624 |
| 19 | 146 < BS <= 171 | 51 | 22624 < BS <= 26487 |
| 20 | 171 < BS <= 200 | 52 | 26487 < BS <= 31009 |
| 21 | 200 < BS <= 234 | 53 | 31009 < BS <= 36304 |
| 22 | 234 < BS <= 274 | 54 | 36304 < BS <= 42502 |
| 23 | 274 < BS <= 321 | 55 | 42502 < BS <= 49759 |
| 24 | 321 < BS <= 376 | 56 | 49759 < BS <= 58255 |
| 25 | 376 < BS <= 440 | 57 | 58255 < BS <= 68201 |
| 26 | 440 < BS <= 515 | 58 | 68201 < BS <= 79846 |
| 27 | 515 < BS <= 603 | 59 | 79846 < BS <= 93479 |
| 28 | 603 < BS <= 706 | 60 | 93479 < BS <= 109439 |
| 29 | 706 < BS <= 826 | 61 | 109439 < BS <= 128125 |
| 30 | 826 < BS <= 967 | 62 | 128125 < BS <= 150000 |
| 31 | 967 < BS <=1132 | 63 | BS > 150000 |

Fig.2

| Index | Buffer Size (BS) value [bytes] | Index | Buffer Size (BS) value [bytes] |
|---|---|---|---|
| 0 | BS = 0 | 32 | 4940 < BS <= 6074 |
| 1 | 0 < BS <= 10 | 33 | 6074 < BS <= 7469 |
| 2 | 10 < BS <= 13 | 34 | 7469 < BS <= 9185 |
| 3 | 13 < BS <= 16 | 35 | 9185 < BS <= 11294 |
| 4 | 16 < BS <= 19 | 36 | 11294 < BS <= 13888 |
| 5 | 19 < BS <= 23 | 37 | 13888 < BS <= 17077 |
| 6 | 23 < BS <= 29 | 38 | 17077 < BS <= 20999 |
| 7 | 29 < BS <= 35 | 39 | 20999 < BS <= 25822 |
| 8 | 35 < BS <= 43 | 40 | 25822 < BS <= 31752 |
| 9 | 43 < BS <= 53 | 41 | 31752 < BS <= 39045 |
| 10 | 53 < BS <= 65 | 42 | 39045 < BS <= 48012 |
| 11 | 65 < BS <= 80 | 43 | 48012 < BS <= 59039 |
| 12 | 80 < BS <= 98 | 44 | 59039 < BS <= 72598 |
| 13 | 98 < BS <= 120 | 45 | 72598 < BS <= 89272 |
| 14 | 120 < BS <= 147 | 46 | 89272 < BS <= 109774 |
| 15 | 147 < BS <= 181 | 47 | 109774 < BS <= 134986 |
| 16 | 181 < BS <= 223 | 48 | 134986 < BS <= 165989 |
| 17 | 223 < BS <= 274 | 49 | 165989 < BS <= 204111 |
| 18 | 274 < BS <= 337 | 50 | 204111 < BS <= 250990 |
| 19 | 337 < BS <= 414 | 51 | 250990 < BS <= 308634 |
| 20 | 414 < BS <= 509 | 52 | 308634 < BS <= 379519 |
| 21 | 509 < BS <= 625 | 53 | 379519 < BS <= 466683 |
| 22 | 625 < BS <= 769 | 54 | 466683 < BS <= 573866 |
| 23 | 769 < BS <= 945 | 55 | 573866 < BS <= 705666 |
| 24 | 945 < BS <= 1162 | 56 | 705666 < BS <= 867737 |
| 25 | 1162 < BS <= 1429 | 57 | 867737 < BS <= 1067031 |
| 26 | 1429 < BS <= 1757 | 58 | 1067031 < BS <= 1312097 |
| 27 | 1757 < BS <= 2161 | 59 | 1312097 < BS <= 1613447 |
| 28 | 2161 < BS <= 2657 | 60 | 1613447 < BS <= 1984009 |
| 29 | 2657 < BS <= 3267 | 61 | 1984009 < BS <= 2439678 |
| 30 | 3267 < BS <= 4017 | 62 | 2439678 < BS <= 3000000 |
| 31 | 4017 < BS <=4940 | 63 | BS > 3000000 |

Fig.3

METHOD AND APPARATUS FOR WIRELESS COMMUNICATION

CROSS-REFERENCE TO RELATED APPLICATIONS

This application is a National stage of International Application No. PCT/CN2018/103262, filed Aug. 30, 2018, which claims priority to International Application No. PCT/CN2017/103977, filed Sep. 28, 2017, which are hereby incorporated by reference.

TECHNICAL FIELD

Embodiments of the disclosure generally relate to wireless communication, and, more particularly, to method, apparatus and computer program product for buffer status report (BSR).

BACKGROUND

BSR is a kind of message such as media access control (MAC) control element (CE) from a terminal device to a network device which carries information on how much data is in the terminal device's buffer to be sent out. After receiving the BSR, the network device would allocate an amount of uplink (UL) grant (such as a resource for physical uplink shared channel (PUSCH)) if the resource is available. With this mechanism, the network can optimize UL resources.

However the existing approaches for BSR are only suitable to a wireless network supporting one numerology and transmission time-interval (TTI) length and might not suit the wireless networks supporting multiple numerologies and TTI lengths. Therefore, it would be desirable to provide a solution for BSR in the networks supporting multiple numerologies and TTI lengths.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

According to an aspect of the disclosure, it is provided a method for buffer status report (BSR). The method comprises comprising: determining respective buffer size tables for at least one logical channel group (LCG) based on at least one reference buffer size (BS) table; generating the BSR for the at least one LCG based on the respective buffer size tables; and transmitting the BSR to a network device, wherein the network device configures a terminal device with the at least one LCG.

According to another aspect of the disclosure, it is provided a method for buffer status report (BSR). The method comprises: receiving a BSR for at least one logical channel group (LCG) from a terminal device; determining respective buffer size (BS) tables for the at least one LCG based on at least one reference BS table; and obtaining respective BS values for the at least one LCG based on the respective buffer size tables; wherein a network device configures the terminal device with the at least one LCG.

According to another aspect of the disclosure, it is provided an apparatus, comprising: a processor; and a memory, the memory containing instructions executable by the processor, whereby the apparatus is operative to: determine respective buffer size tables for at least one logical channel group (LCG) based on at least one reference buffer size (BS) table; generate the BSR for the at least one LCG based on the respective buffer size tables; and transmit the BSR to a network device, wherein the network device configures a terminal device with the at least one LCG.

According to another aspect of the disclosure, it is provided an apparatus, comprising: a processor; and a memory, the memory containing instructions executable by the processor, whereby the apparatus is operative to: receive a BSR for at least one logical channel group (LCG) from a terminal device; determine respective buffer size (BS) tables for the at least one LCG based on at least one reference BS table; and obtain respective BS values for the at least one LCG based on the respective buffer size tables; wherein a network device configures the terminal device with the at least one LCG.

According to another aspect of the disclosure, it is provided a computer program product. The computer program product comprises instructions which when executed by at least one processor, cause the at least one processor to determine respective buffer size tables for at least one logical channel group (LCG) based on at least one reference buffer size (BS) table; generate the BSR for the at least one LCG based on the respective buffer size tables; and transmit the BSR to a network device, wherein the network device configures a terminal device with the at least one LCG.

According to another aspect of the disclosure, it is provided a computer readable storage medium. The computer readable storage medium comprises instructions which when executed by at least one processor, cause the at least one processor to determine respective buffer size tables for at least one logical channel group (LCG) based on at least one reference buffer size (BS) table; generate the BSR for the at least one LCG based on the respective buffer size tables; and transmit the BSR to a network device, wherein the network device configures a terminal device with the at least one LCG.

According to another aspect of the disclosure, it is provided a computer program product. The computer program product comprises instructions which when executed by at least one processor, cause the at least one processor to receive a BSR for at least one logical channel group (LCG) from a terminal device; determine respective buffer size (BS) tables for the at least one LCG based on at least one reference BS table; and obtain respective BS values for the at least one LCG based on the respective buffer size tables; wherein a network device configures the terminal device with the at least one LCG.

According to another aspect of the disclosure, it is provided a computer readable storage medium. The computer readable storage medium comprises instructions which when executed by at least one processor, cause the at least one processor to receive a BSR for at least one logical channel group (LCG) from a terminal device; determine respective buffer size (BS) tables for the at least one LCG based on at least one reference BS table; and obtain respective BS values for the at least one LCG based on the respective buffer size tables; wherein a network device configures the terminal device with the at least one LCG.

These and other objects, features and advantages of the disclosure will become apparent from the following detailed description of illustrative embodiments thereof, which are to be read in connection with the accompanying drawings.

BRIEF DESCRIPTION OF THE DRAWINGS

FIG. 2 shows an example of a buffer size table;

FIG. 3 shows another example of a buffer size table;

DETAILED DESCRIPTION

Figure 1:
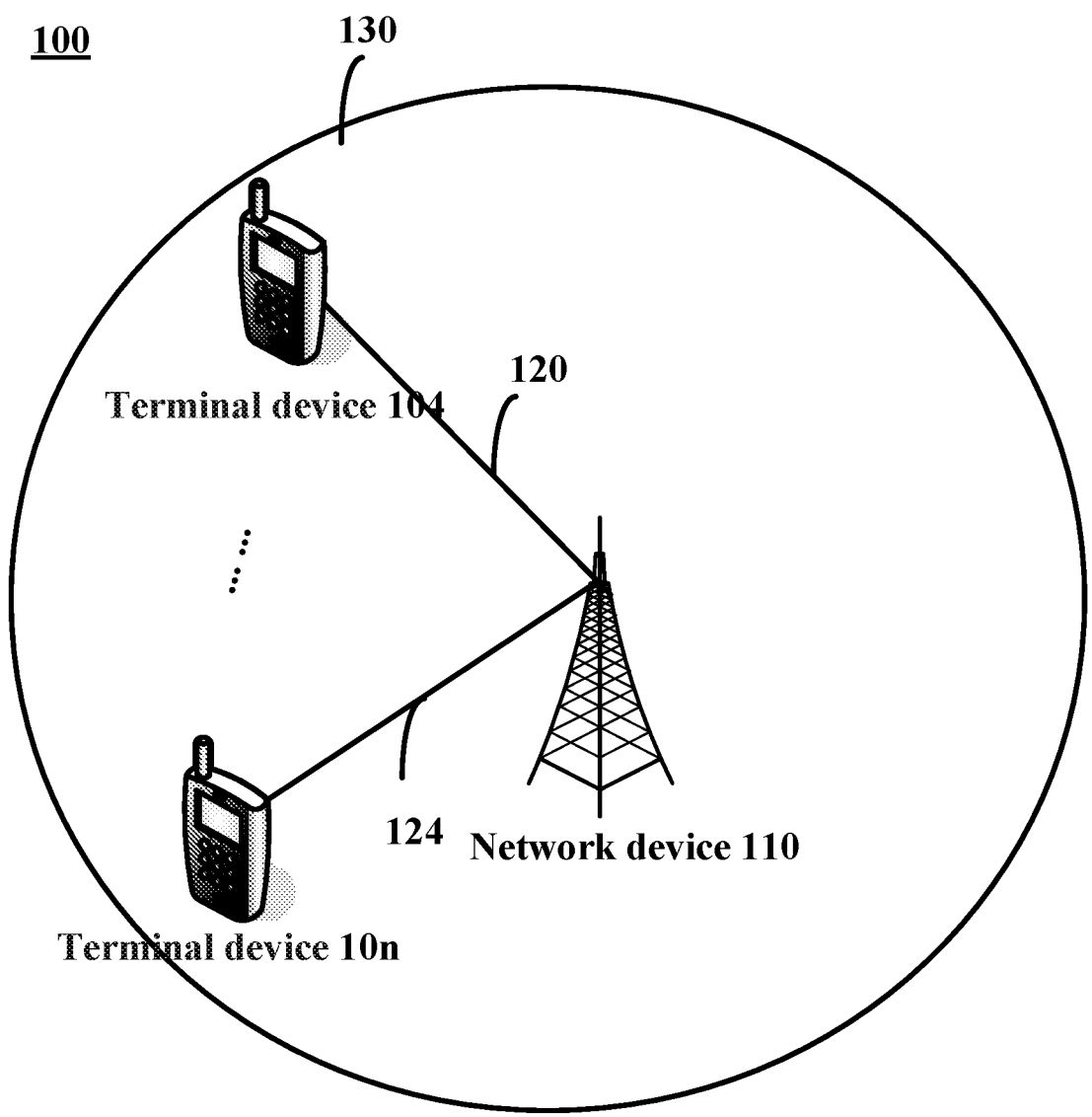
FIG. 1 depicts a schematic system, in which some embodiments of the present disclosure can be implemented.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In LTE, BSR was specified as one of the functionalities in layer 2. BSR carries more detailed information for a LCG. The BSR transmission can be triggered in several ways, for example when new UL data arrives to an empty buffer or if higher priority data arrives (i.e. higher priority than already existing data). BSR can also be triggered periodically. The network allocates UL grants to a UE according to the UE's buffer status that UE reported via BSR.

Figure 6:
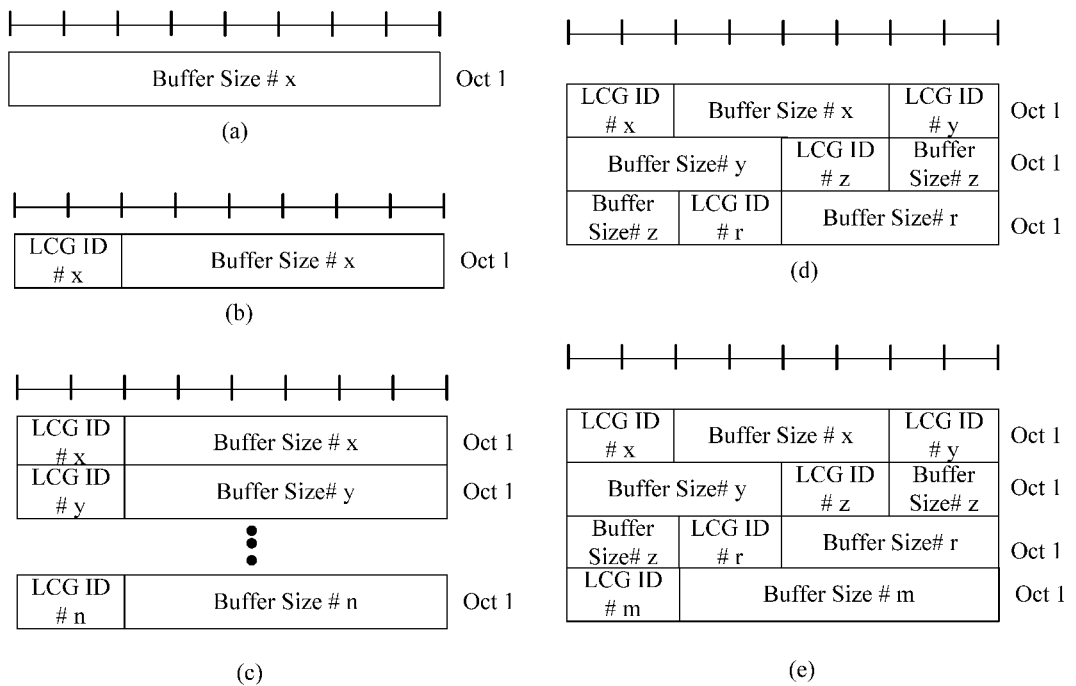
FIG. 6 shows several formats for the first format of BSR according to an embodiment of the present disclosure.

In Section 6.1.3.1 of 3GPP Specification 36.213-d00, the disclosure of which is incorporated by reference herein in its entirety, it specifies MAC CEs and the buffer size level for the BSR. BSR MAC CEs consist of either:

Short BSR and Truncated BSR format: one LCG identification (ID) field and one corresponding Buffer Size (BS) field as shown in FIG. 6.1.3.1-1 of 3GPP Specification 36.213-d00; or Long BSR format: four Buffer Size fields, corresponding to LCG IDs #0 through #3 as shown in FIG. 6.1.3.1-2 of 3GPP Specification 36.213-d00.

The fields of LCG ID and BS are defined as follow:
LCG ID: The LCG ID field identifies the LCG which buffer status is being reported. The length of the field is 2 bits;
BS: The BS field identifies the total amount of data available across all logical channels of a LCG after all MAC protocol data units (PDUs) for the TTI have been built.

The amount of data is indicated in number of bytes. It shall include all data that is available for transmission in the radio link control (RLC) layer and in the packet data convergence protocol (PDCP) layer; The size of the RLC and MAC headers are not considered in the buffer size computation. The length of this field is 6 bits. If extended BSR-Sizes is not configured, the values taken by the Buffer Size field are shown in FIG. 2 which is a copy of the Table 6.1.3.1-1 in 3GPP Specification 36.213-d00. If extended BSR-Sizes is configured, the values taken by the Buffer Size field are shown in FIG. 3 which is a copy of the Table 6.1.3.1-2 in 3GPP Specification 36.213-d00.

The BS field represents the 'Index' value of the BS table. BSR index (value) 0 means the terminal device has no data to transmit and as the number gets larger, it means the terminal device has more data to transmit.

In LTE, the BS tables as shown in FIGS. 2-3 are generated considering the below formula (1)

$$B_k = \lceil B_{min}(1-p)^k \rceil \qquad (1)$$

where $p=(B_{max}/B_{min})^{1/(N-1)}-1$ which indicates the step size between two subsequent BS levels. N is the number of steps which is calcualted based on the number of bits of the BS field. Given the BS field in LTE is 6 bits, assuming that the index "000000" is reserved to report an "empty buffer", then there are $2^6-1=63$ (exponentially distributed) buffer size levels, i.e., N=63. k is an index for the buffer size value in the BS table, $B_k$ is the corresponding buffer size value with the index k, and $B_{max}$, and $B_{min}$ are maximum and the minimum possible buffer sizes that a UE may report. $B_{min}$ is 10 bytes. For the BS table as shown in FIG. 2, $B_{max}$ is determined taking into account the maximum UL transport block size and a hybrid automatic repeat request (HARQ) acknowledge time of 2 HARQ round trip times (RTTs). For example, with a maximum transport block size of 75376 bits and a response time of 2 RTTs (including transmission, processing as well as scheduling delay), $B_{max}$ is derived as:

$$B_{max}=(75376\times16)/8\approx150 \text{ Kbyte}$$

In LTE Rel-10, the BS table as shown in FIG. 3 is added to support higher data rate for carrier aggregation (CA) and multi input and multi output (MIMO), where $B_{max}$ is extended to fit with 4 layers UL MIMO and 5 UL component carriers (CC) and shown as below:

$$B_{max}=(75376\times16\times4\times5)/8\approx3000 \text{ Kbytes.}$$

In 3GPP Rel-15, a work item for new radio (NR), is being progressed in 3GPP. As planned in the work scope, NR may operate from below 1 GHz to around 100 GHz. The carrier bandwidth can be various within a large range (e.g. 10 MHz to 1 GHz) depending on the availability and definition of potential NR carriers.

Although NR may support a carrier bandwidth up to 1 GHz, there are necessitates for UEs to be able to use only a part of the carrier bandwidth:

For battery saving and cost reduction, it may be sufficient for a low cost UE to support/use a narrow segment of the carrier bandwidth, for example an NB-IoT UE is allowed to use only 180 k Hz bandwidth as specified in 3GPP Rel-14. In another case, even if the UE is capable to operate the same carrier bandwidth as the network, it does not mean that the UE has to use the whole carrier width all the time. The UE may be configured with a smaller bandwidth than the carrier bandwidth according to the data rate requirement of the preferred or on going service.

In general, NR may support multiple numerology operation which may comprise two scenarios:

Scenario 1: Different numerologies can be configured for different carriers. For instance, small subcarrier spacing (SCS) may be applied for carriers of low frequency and large SCS may be applied for carrier of high frequency. For one given carrier frequency range, there may be more than one candidate numerology so that the network can select which numerology is to be applied for one carrier within the range considering the traffic quality of service (QoS) requirement and/or network dimension requirement. For one instance, if the network coverage is more a priority than transmission delay in air interface, the network can configure a small SCS for one carrier at low frequencies. For another instance, if radio access network (RAN) transmission delay is more a priority than the network coverage, the network can configure a large SCS for the carrier to get a short TTI duration. In addition, the bandwidth and transmission time interval (TTI) may be different for different carriers.

Scenario 2: There can be multiple BandWidth Parts (BWPs) configured in one carrier and one UE can be configured with one or multiple BWPs. Different BWPs may be configured with different numerologies to meet different QoS requirements.

For BS table in NR or any other communication system supporting multiple numerologies and TTI lengths, the same formula (1) can be applied. However, the values of the parameters (i.e. $B_{max}$, $B_{min}$ and N) may be different from that in LTE. In addition, NR or other communication system may generate the BS table in any other suitable ways.

For example, considering a NR UE may be configured with at least one numerology and TTI length, the HARQ RTT time for each HARQ transmission may be different depending on the used numerology and TTI length for that transmission, and the different buffer size values can be reported by the UE for each BSR cycle. This means that the existing tables for LTE BSR size is insufficient for NR, since the BS tables for LTE are designed based on the subcarrier spacing of 15 kHz and the TTI length of 1 ms.

Therefore, it is desirable to provide a solution for transmitting the BSR in a wireless network supporting different numerologies and TTI lengths.

To overcome or mitigate at least one of the above-mentioned problems or other problems, the embodiments of the disclosure propose a solution for BSR. According to the embodiments, at least one reference BS table is created to support at least one numerology and/or TTI length. For example, a shorter HARQ RTT time may apply a BS table which is selected from the at least one reference BS table or may be created by using a common/reference BS table to multiply a scaling factor. The scaling factor may be determined considering factors, including the maximum uplink transport block size, the maximum number of layers, the maximum number of component carriers (CCs), the maximum carrier bandwidth of each CC that a UE may support, the longest HARQ RTT length and the fraction of UL slots in case of time division duplex (TDD), BSR report interval, and the number of bits that the BS field occupies.

It is noted that though the embodiments below are mainly described in the context of the NR system, they are not limited to this but can be applied to any suitable wireless system that can benefit from the embodiments as described herein. In addition, it is noted that the embodiments can be applied to unlicensed channel operation and/or licensed channel operation.

Now some exemplary embodiments of the present disclosure will be described below with reference to the figures.

FIG. 1 depicts a schematic system, in which some embodiments of the present disclosure can be implemented. As shown in FIG. 1, the wireless system 100 comprises a network device 110 such as a cellular base station, for example a gNB in NR. The network device 110 may refer to a function element on the network side as compared to a terminal device or UE. For example, the network device 110 may comprise an eNB, a Home eNode B, a femto Base Station, a pico BS, gNB or any other node capable to serve terminal devices 104-10n in the system 100. It is well known that a cellular radio system may comprise a network of radio cells each served by a transmitting station, known as a cell site or base transceiver station. The radio network provides wireless communications service for a plurality of transceivers (in most cases mobile). The network of network devices working in collaboration allows for wireless service which is greater than the radio coverage provided by a single network device. The individual network device may be connected by another network (in many cases a wired network, not shown), which includes additional controllers for resource management and in some cases access to other network systems (such as the Internet) or metropolitan area networks (MANs). The circle 130 schematically indicates a coverage range of the network device 110.

As shown in FIG. 1, the system 100 may comprise one or more UEs or terminal devices 104-10n, each of which may operably communicate with the network device 110 such as a cellular base station through a wireless link, such as link 120 and 124. The terminal devices 104-10n can be fixed or moveable. Terminal devices 104-10n may include, but not limited to, cellular telephones, smart phones, and computers, whether desktop, laptop, or otherwise, as well as mobile devices or terminals such as cellular network UEs, machine type communication devices, handheld computers, personal digital assistants (PDAs), wireless sensors, wearable devices, video cameras, set-top boxes, personal media devices, or any combinations of the foregoing, which may be provided with wireless communication functionality and run with any kind of operating system including, but not limited to, Windows, Linux, UNIX, Android, iOS and their variants.

In addition, though only one network device 110 is shown in FIG. 1, there may be two or more network devices such that some terminal devices are within the coverage range of first network device, some terminal devices are within the coverage range of second network device, and some terminal devices are at the border of the coverage ranges of two or more network devices, and so on. In the latter case, the terminal devices may receive signals from each of the two or more network devices.

Figure 4:
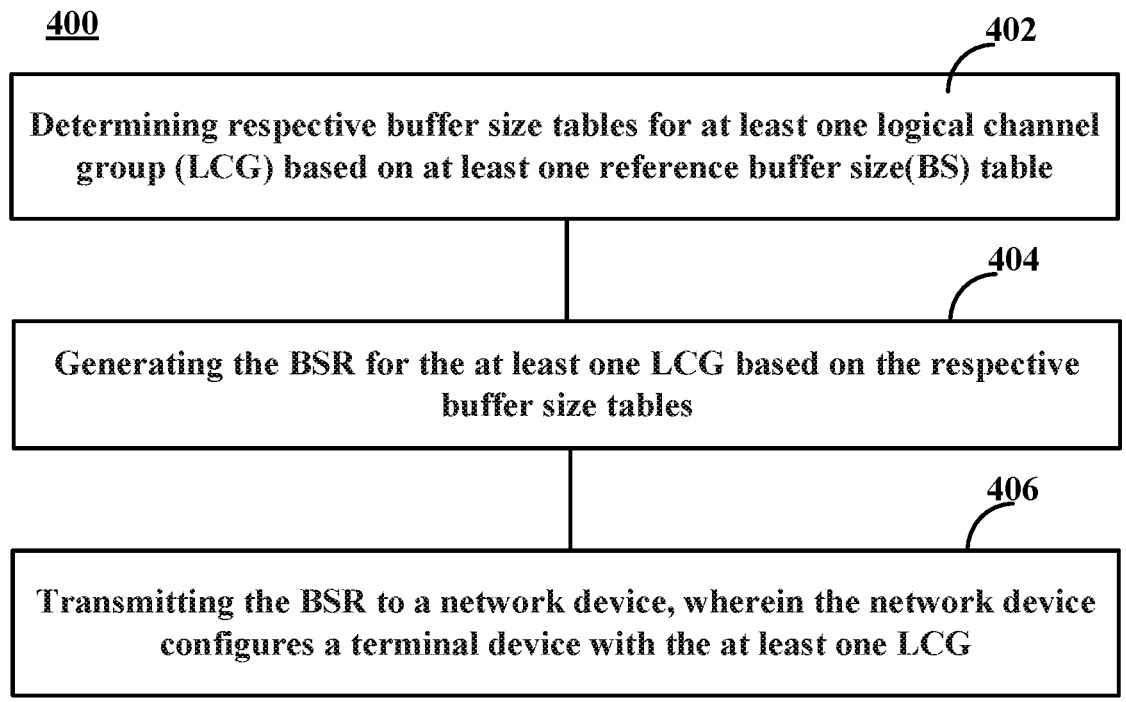
FIG. 4 is a flow chart depicting a method according to an embodiment of the present disclosure.

FIG. 4 is a flow chart depicting a method 400 according to an embodiment of the present disclosure, which may be performed at an apparatus such as the terminal device 104 of FIG. 1. As such, the terminal device 104 may provide means for accomplishing various parts of the method 400 as well as means for accomplishing other processes in conjunction with other components.

As shown in FIG. 4, the method 400 may start at block 402 where the terminal device 104 determines respective buffer size tables for at least one LCG based on at least one reference BS table. A LCG is a group of logical channels and has a buffer status associated with the group of logical channels to be reported. The network may configure the terminal device with at least one LCG each of which may have its own LCG ID.

The at least one reference BS table may be prestored in the terminal device 104 or signaled to the terminal device 104. In addition, the network device may know which reference BS table(s) has been prestored in or signaled to the terminal device. The terminal device 104 may prestore all the reference BS tables of the network in its storage or memory, or prestore a part of the reference BS tables which are supported by the terminal device 104 in its storage or memory. Alternatively, the network device may signal the required reference BS tables to the terminal device. In addition, when a new reference BS table has been created, the network device may signal the new reference BS table to the terminal device as required.

The reference BS table may be created based on any suitable parameters such as a maximum uplink transport block size, the maximum number of layers, the maximum number of component carriers (CCs), a maximum carrier bandwidth of each CC supported by the terminal device, a longest round trip time (RTT) length of a hybrid automatic repeat request (HARQ), a fraction of uplink slots in case of time division duplex, BSR report interval, and the number of bits occupied by a buffer size field in the BSR, wherein a layer means a data stream from a transmitter to a receiver and for single user spatial multiplexing, the maximum number of layers that can be multiplexed may not exceed the channel rank.

For example, the maximum buffer size reported by the terminal device may be calculated as:

$$B_{max}=\text{(maximum uplink transport block size×maximum number of layers×maximum number of CCs×(2×longest HARQ RTT length)×the fraction of UL slots in case of TDD)}/8 \text{ bytes } \#$$

In another example, the maximum buffer size reported by the terminal device may be calculated as:

$$B_{max}=\text{(maximum uplink transport block size×maximum number of layrs×maximum number of CCs×(2×longest HARQ RTT length)×the fraction of UL slots in case of TDD×a scaling factor)}/8 \text{ bytes}$$

It is noted that the above calculations of $B_{max}$ are only exemplary and $B_{max}$ may be determined in any other suitable ways in other embodiments. For example, $B_{max}$ may be predefined or the calculation of $B_{max}$ may use a part of above parameters and/or other parameters. The minimum buffer size $B_{min}$ may be predefined. When $B_{max}$, $B_{min}$ and the number of buffer size levels is determined, a reference BS table can be created by using for example above formula (1). The reference BS table may have the similar form as shown in FIGS. 2-3. In addition, the number of table entries in the reference BS table may be $2^n$, wherein n is an integer such as 4-8 or other integer.

In this embodiment, the terminal device may determine respective buffer size tables for at least one LCG based on at least one reference BS table in any suitable ways. For example, when there is only one reference BS table prestored in or signaled to the terminal device, the terminal device may use this reference BS table as a common BS table for respective LCGs.

In an embodiment, the terminal device may select the respective BS tables for the at least one LCG from the at least one reference BS table based on a rule, wherein the rule may be prestored in the terminal device or signaled to the terminal device. For example, the network device may signal the rule to the terminal device by a system broadcast signaling or UE dedicated RRC signaling, or send the rule in a random access response (RAR) message or via other L1/L2 signaling such as physical downlink control channel (PDCCH) like command, or MAC CEs.

The rule can comprise any suitable rule information. The rule may indicate selecting the reference BS table based on the numerology/TTI length. For example, if a LCG maps to a specific numerology/TTI length, then the terminal device may select the reference BS table associated with the specific numerology/TTI length as the BS table for the LCG. The rule may indicate selecting the reference BS table based on the service type. For example, if a LCG corresponds to a real-time service such as voice over internet protocol, then the terminal device may select a reference BS table associated with a short TTI length as the BS table for the LCG. As another example, if a LCG corresponds to a video service, then the terminal device may select a reference BS table associated with a larger buffer size as the BS table for the LCG.

In another embodiment, the terminal device may generate the respective BS tables based on the at least one reference buffer size table and respective scaling factors associated with the at least one LCG, wherein the respective scaling factors are determined by the terminal device or signaled to the terminal device. In the case of the respective scaling factors being signaled to the terminal device, the network device may signal the respective scaling factors to the terminal device by the system broadcast signaling or UE dedicated RRC signaling, or send the respective scaling factors in a random access response (RAR) message or via other L1/L2 signaling such as physical downlink control channel (PDCCH) like command, or MAC CEs. In the case of the respective scaling factors being determined by the terminal device, the rule of calculating the scaling factors may be predefined or signaled to the terminal device. When there are two or more reference BS tables stored in or signaled to the terminal device, the terminal device may first select a reference BS table for a LCG and then generate the BS tables for the LCG based on the selected reference BS table and the scaling factor associated with the LCG. The selection of a reference BS table may be based on a predefined rule or signaled to the terminal device.

Figure 5:
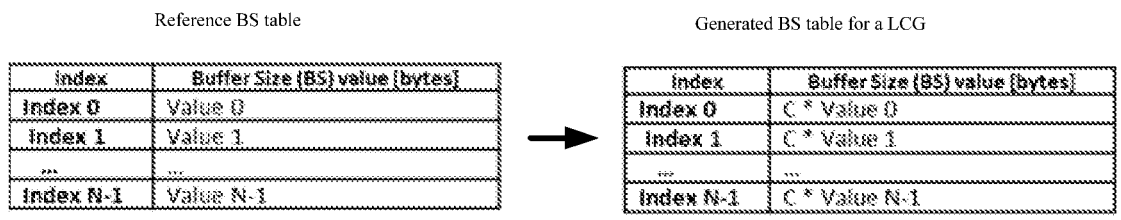
FIG. 5 is a diagram showing how to generate a BS table based on a reference buffer size table and a scaling factor according to an embodiment of the present disclosure.

FIG. 5 is a diagram showing how to generate a BS table based on a reference buffer size table and a scaling factor. As shown in FIG. 5, each BS value in the reference BS table will multiply by a scaling factor c to generate a new BS table for the LCG.

The scaling factors can be determined in any suitable ways. For example, a numerology/transmission time-interval (TTI) length, HARQ RTT or service type may be assigned a specific scaling factor. Then the terminal device may determine the scaling factor for a LCG based on the numerology/transmission time-interval (TTI) length, HARQ RTT or service type associated with the LCG.

In an embodiment, the at least one reference BS table is associated with respective reference numerologies/transmission time-interval (TTI) lengths, BSR report interval, or HARQ RTTs, and the scaling factors may be determined based on the reference numerologies/transmission time-interval (TTI) lengths, BSR report interval, or HARQ RTTs and numerologies/TTI lengths, BSR report interval, or HARQ RTTs associated with the at least one LCG. For example, the scaling factor may be determined by any suitable function f(x,y) where x denotes a reference numerology/TTI length, BSR report interval, or HARQ RTT and y denotes the numerology/TTI length, BSR report interval, or HARQ RTT associated with the LCG. The function f(x,y) can take any suitable form.

In an embodiment, the scaling factor may be determined by one of using a TTI length associated with a LCG to divide a reference TTI length; and using a HARQ RTT associated with a LCG to divide a reference HARQ RTT length. For example, the scaling factor is calculated as 0.5 for a LCG when the reference TTI length is 1 ms and the TTI length associated with the LCG is 0.5 ms. As another example, the scaling factor is calculated as 0.8 for a LCG when the reference HARQ RTT length is 1 ms and the HARQ RTT length associated with the LCG is 0.8 ms.

In an embodiment where a logical channel of a LCG maps to more than one numerology/TTI duration with different HARQ RTTs, the terminal device may use the longest HARQ RTT of the different HARQ RTTs to divide the reference HARQ RTT length to obtain the scaling factor. For example, if a LCG maps to two numerologies/TTI durations where one numerology is with 0.9 ms HARQ RTT length and the other one is with 0.8 ms HARQ RTT length, then the scaling factor for the LCG is calculated as 0.9 by using the longest HARQ RTT (0.9 ms) to divide the reference HARQ RTT length such as 1 ms.

In an embodiment, at least one of the respective BS tables may be generated by using a subset of the table entries of a reference BS table, wherein the number of table entries in the subset may be determined based on the respective number of bits of a BS field. As described above, the BSR may contain the BS field. The size of the BS field can be configured by the network based on the priority, the service type, or the data rate requirement for the LCG. This configuration can be LCG specific. For example, for VoIP (voice over IP) like traffic which has low data rate, the BS field may use less bits such as 4 bits, and for other LCG with higher data rate, the BS field may use more bits such as 6 bits. The size of the BS field may define the number of buffer size levels or the number of table entries. For example, the number of buffer size levels may be $2^n$ where n is the number of bits of the BS field. When the number of table entries in the reference BS table is larger than that defined by the number of bits of the BS field for the LCG, a subset of the table entries of a reference BS table may be selected to generate the BS table for the LCG. The subset of the table entries may be located at any suitable location of the reference BS table. It is noted that index 0 may be included in the subset since index 0 means that there is no data to be transmitted for the LCG. In addition, the BS size value for some index(es) in the subset may be redefined. For example, if the subset comprise index 0-31 of the table as shown in FIG. 2, then the BS value for index 31 may be redefined as BS>967. In addition, when the scaling factor is used in this embodiment, the BS values for the subset of the table entries may multiply by the scaling factor.

At block 404, the terminal device may generate the BSR for the at least one LCG based on the respective buffer size tables. For example, if the BSR transmission is triggered, then the terminal device may generate the BSR.

In an embodiment, the BSR may have a first format comprising a LCG ID field and a BS field. The size of the first format may be equal to, greater than or smaller than 8 bits. The size of the LCG ID field may be configured by the network device in any suitable ways. For example, the size of the LCG ID field may be configured based on at least one of the number of LCGs in a network, the number of LCGs used by the mobile terminal and the number of LCGs in a subset of LCGs selected by the network device, wherein the selected LCGs are able to use the first format, and the selection of the subset of LCGs may be based on at least one of the LCG/logical channel (LCH) priorities, the volume of available data for the LCG and service type of the LCG. For example, if the number of LCGs is in the range of $2^x$~$2^{x+1}$, then the size of the LCG ID field may take x bits. As an example, if a UE is configured with equal to or less than 4 LCGs, the LCG ID field may occupy 2 bits. As another example, if a UE is configured with only 1 LCG, the LCG ID field can be omitted. The BS field may be configured by the network for example depending on the BS value granularities and the number of the entries in the BS table for the LCG.

FIG. 6 shows several formats for the first format of BSR according to an embodiment of the present disclosure. As shown in FIG. 6, the first format (a) may omit the LCG ID field if a UE is configured with only 1 LCG; the first format (b) may comprise only one LCG ID field and one corresponding BS field; the first formats (c), (d) and (e) may comprise multiple LCG ID fields and respective BS fields, wherein the size of the BS field is different in the first formats (c) and (d), and the first format (e) shows that each LCG may have the same or different size of the BS field. It is noted that the formats shown in FIG. 6 are only exemplary, and the first format can take any other suitable forms in other embodiments.

The network can configure a LCG whether it supports to report/trigger the first format of BSR based on at least one of the LCG/logical channel (LCH) priorities, the volume of available data for the LCG and service type of the LCG. For example, a LCG/LCH with higher priority, a LCG with a small volume of available data or a LCG for real-time service such as voice service may be selected to use the first format of BSR. In this way, there will be a subset of LCGs among all LCGs can report the first format of LCG. This subset of LCGs would change their LCG IDs to fit with fewer bits. Then the BS field may have more bits to better fit the BS value granularities and the number of the entries in the BS table for the LCG. Since the first format comprises the LCG ID field, the terminal device may comprise, in the BSR, the buffer status of one or more LCGs which have data to be transmitted.

In another example, the BSR may have a second format comprising at least the BS field, wherein the size of BS field for a specific LCG is configured by the network device based on at least one of a priority for the specific LCG and the data rate requirement for the LCG. For example, for VoIP like traffic which has low data rate, the BS field may occupy fewer bits such as 4 bits, and for other LCG with higher data rate, the BS field may occupy more bits such as 8 bits. As another example, a LCG with high data rate may occupy more bits such as 8 bits, and a LCG with low data rate may occupy fewer bits such as 4 bits.

Figure 7:
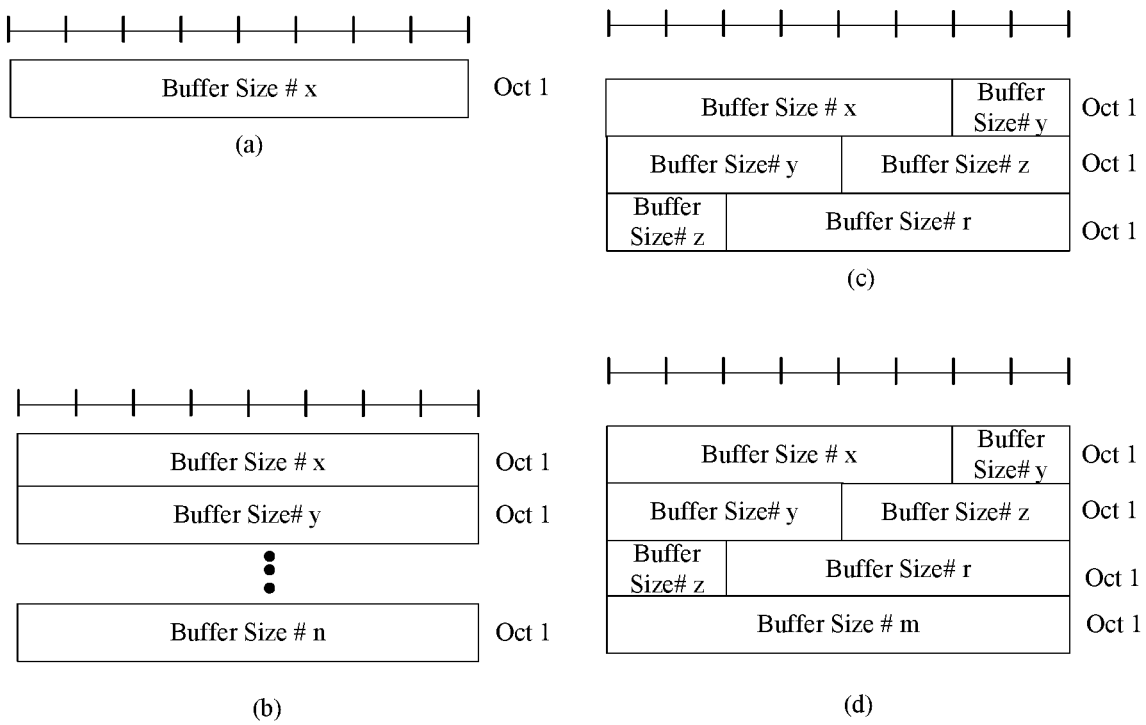
FIG. 7 shows several formats for the second format of BSR according to an embodiment of the present disclosure.

FIG. 7 shows several formats for the second format of the BSR according to an embodiment of the present disclosure. As shown in FIG. 7, the second format (a) may comprise one BS field when the terminal device is configured with only one LCG; the second formats (b), (c) and (d) may comprise multiple BS fields when the terminal device is configured with multiple LCGs, wherein the size of the BS field is different in the second formats (b) and (c), and the second format (d) shows that each LCG may have the same or different size of the BS field. It is noted that the formats shown in FIG. 7 are only exemplary, and the second format can take any other suitable forms in other embodiments. Since the second format does not comprise the LCG ID field, the terminal device may comprise the buffer status of all the LCGs used by the terminal device in the BSR.

At block 406 in FIG. 4, the terminal device may transmit the BSR to a network device. If the BSR transmission is triggered, the terminal device may generate and transmit the BSR to the network device. For example, the terminal device may generate and transmit the BSR when a new data arrives in the buffer for a LCG or when the new data has higher priority than the one already waiting in the buffer. The terminal device may generate and transmit the BSR with the predefined periodicity. The periodicity may be defined by network and get informed to UE by a message. The BSR may be generated and sent when the number of padding bits in a data message is larger than the size of BSR, so that the padding bit space can be used to send the BSR.

Therefore, here are some summary for BS table design in NR system.

Given VoIP services are continuously to exist in NR and the packet compression functions are largely reused at PDCP layer, it is reasonable to reuse the same minimum buffer size level, i.e., $B_{min}$=10 bytes for NR as a starting point. Meanwhile, NR has introduced a new layer SDAP to support the mapping between flows to DRBs, which adds 1 byte additional overhead, $B_{min}$ in formula (1) can be updated to 11 bytes.

At the same time, NR system is designed to support a wide range of services which vary in the data rate range from a very low rate up to a very high rate. It is beneficial to update $B_{max}$ and N to give an increased granularity and an enlarged rate range of the buffer sizes. Therefore, the design approach for LTE BS size value tables should be applied for NR with updated parameters (i.e. $B_{min}$, $B_{max}$, and N) in aforementioned formula (1).

It is further noted that 6 bits may not be sufficient to convey a buffer status with the granularity required for the wide range of services expected to be support by NR. The prime targets of NR include extreme MBB rates (10 Gbps), but also much lower rates e.g. from less extreme MBB or URLLC, and moreover an increased mix of high and low rate services. This could make the buffer sizes for the different LCGs to change rapidly and an increased granularity of the buffer sizes would be of great benefit for the scheduler. One way to encode such granularity would be to byte-align the fields and thereby simply extend the size of the Buffer Status field to 8 bits. For the long BSR format, it is suggested to increase BS field to 8 bits.

The two BS size value tables in LTE are applied for scenarios with and without enhanced data rates (i.e., CA and MIMO) separately. Since most NR terminals are expected to support CA and MIMO features, there might be no need to have two BS size tables for long BSR format.

One proposal is that NR supports one BS size value table with 256 steps for long BSR format. Similar as that in LTE, the value of $B_{max}$ is derived based on the uplink peak data rate, i.e., the maximum uplink transport block size and the expected response time after a buffer status report is transmitted (i.e. the time duration between a buffer status report and the corresponding uplink grant), the number of layers, and the number of CCs. For the response time, the 2 times of HARQ RTT was used in LTE considering the delay components such as HARQ transmission, the delay component due to dynamic scheduling (processing time, encoding and decoding of data/grant) etc. In NR, the UP processing time and scheduling time have been significant reduced by optimization, therefore, we think 1 HARQ RTT is sufficient to be considered. Given NR supports different lengths of the transmission durations, we think the largest HARQ RTT should be considered to.

Another proposal is that the value of $B_{max}$ is derived based on the product of the maximum uplink transport block size, the largest HARQ RTT, the number of layers, and the number of CCs. The maximum uplink transport block size is determined by RAN1, while the value of N can be determined by RAN2, since it is directly related to the BSR MAC CE formats.

Another proposal is that RAN1 feedback determines the value of maximum uplink transport block size.

Besides long BSR format, NR standard discussion has agreed to keep 1-byte short BSR format like in LTE. In that case, the BS field is 5 bits. This disclosure provides two options to report buffer status in short BSR format. One option is to create a new separate BS size value table for short BSR, and the other is to scale the base BS size value tables.

The short BSR format is typically applied when there is a small uplink grant, where it is more important to give more accurate BS information to avoid padding in the MAC PDU. In other words, it is important for the BS size table to provide a finer granularity. Therefore, we think option 1 is more reasonable to choose. The scaling of the base BS size tables may lead to a risk of reduced BS value granularities and reduced BS range.

Figure 8:
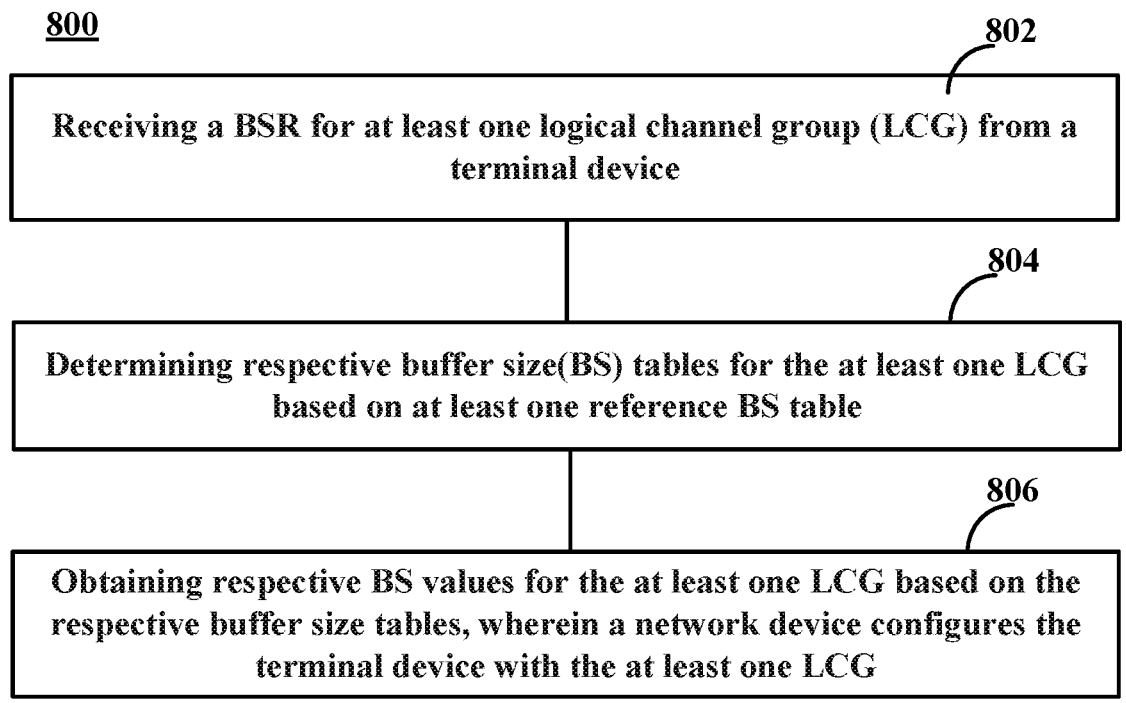
FIG. 8 is flow chart depicting a method according to an embodiment of the present disclosure.

Furthermore, on the basis that NR defines a separate BS size table with 32 steps for short BSR format, value of $B_{max}$ is set as 967 bytes for short BSR format. In LTE, if extendedBSR-Sizes is not configured, the values taken by the Buffer Size field are defined in Table 6.1.3.1-1 in 36.213. Based on that table, the maximum buffer size level assuming BS field is 5 bits would be 967 bytes. This value can be reused as the maximum buffer size level for short BSR format in NR. FIG. 8 is flow chart depicting a method 800 according to an embodiment of the present disclosure, which may be performed at an apparatus such as network device 110 of FIG. 1 or the apparatus may be included in the network device 110. As such, the apparatus may provide means for accomplishing various parts of the method 800 as well as means for accomplishing other processes in conjunction with other components. For some parts which have been described in the above embodiments, detailed description thereof is omitted here for brevity.

As shown in FIG. 8, the method 800 may start at block 802 where the network device 110 receives a BSR for at least one LCG from a terminal device. For example, the terminal device may generate and transmit the BSR to the network device in various ways as described above, and then the network device 110 may receive the BSR. The network device 110 may configure the terminal device with the at least one LCG each of which may have its own LCG ID.

In an embodiment, the BSR may have a first format comprising a logical channel group ID field and a buffer size field, wherein the size of the logical channel group ID field is configured by the network device based on at least one of the number of LCGs in a network, the number of LCGs used by the mobile terminal, the number of LCGs in a subset of LCGs selected by the network device, wherein the selected LCGs are able to use the first format, and the selection of the subset of LCGs is based on at least one of the LCG/logical channel (LCH) priorities, the volume of available data for the LCG and service type of the LCG as described above with reference to FIG. 6.

The network can configure a LCG whether it supports to report/trigger the first format of BSR based on at least one of the LCG/logical channel (LCH) priorities, the volume of available data for the LCG and service type of the LCG.

In another example, the BSR may have a second format comprising at least the BS field, wherein the size of buffer size field for a specific LCG is configured by the network device based on at least one of a priority for the specific LCG and the data rate requirement for the LCG as described above with reference to FIG. 7.

At block 804, the network device 110 determines respective buffer size (BS) tables for the at least one LCG based on at least one reference BS table. The at least one reference BS table may be prestored in the network device 110. In addition, the network device may know which reference BS table(s) has been prestored in or signaled to the terminal device. The network device 110 may prestore all the reference BS tables of the network in its storage or memory, or prestore a part of the reference BS tables which are used by the network device 110 in its storage or memory.

The reference BS table may be created based on any suitable parameters such as a maximum uplink transport block size, the maximum number of layers, the maximum number of component carriers (CCs), a maximum carrier bandwidth of each CC supported by the terminal device, a longest round trip time (RTT) length of a hybrid automatic repeat request (HARQ), a fraction of uplink slots in case of time division duplex, BSR report interval, and the number of bits occupied by a buffer size field in the BSR as described above.

In this embodiment, the network device 110 may determine respective buffer size tables for at least one LCG based on at least one reference BS table in any suitable ways. For example, when there is only one reference BS table is configured to the terminal device, the network device 110 may use this reference BS table as a common BS table for respective LCGs of the terminal device.

In an embodiment, the network device 110 may select the respective BS tables for the at least one LCG from the at least one reference BS table based on a rule. The rule may be prestored in the network device 110. In addition, both the network device 110 and the terminal device may know and the same rule.

The rule can comprise any suitable rule information. The rule may indicate selecting the reference BS table based on the numerology/TTI length. For example, if a LCG maps to a specific numerology/TTI length, then the network device 110 may select the reference BS table associated with the specific numerology/TTI length as the BS table for the LCG. The rule may indicate selecting the reference BS table based on the service type. For example, if a LCG corresponds to a real-time service, then the network device 110 may select a reference BS table associated with a short TTI length as the BS table for the LCG. As another example, if a LCG corresponds to a video service, then the network device 110 may select a reference BS table associated with a larger buffer size as the BS table for the LCG.

In another embodiment, the network device 110 may generate the respective BS tables based on the at least one reference buffer size table and respective scaling factors associated with the at least one LCG, wherein the respective scaling factors are determined by the network device 110. In addition, the network device may signal the respective scaling factors to the terminal device by the system broadcast signaling or UE dedicated RRC signaling, or send the respective scaling factors in a random access response (RAR) message or via other L1/L2 signaling such as physical downlink control channel (PDCCH) like command, or MAC CEs. The rule of calculating the scaling factors may be predefined. When there are two or more reference BS tables configured to the terminal device, the network device 110 may first select a reference BS table for a LCG and then generate the BS tables for the LCG based on the selected reference BS table and the scaling factor associated with the LCG. The selection of a reference BS table may be based on a predefined rule.

The scaling factors can be determined in any suitable ways. For example, a numerology/transmission time-interval (TTI) length, HARQ RTT or service type may be assigned a specific scaling factor. Then the network device 110 may determine the scaling factor for a LCG based on the numerology/transmission time-interval (TTI) length, HARQ RTT or service type associated with the LCG.

In an embodiment, the at least one reference BS table is associated with respective reference numerologies/transmission time-interval (TTI) lengths, BSR report interval, or HARQ RTTs, and the scaling factors may be determined based on the reference numerologies/transmission time-interval (TTI) lengths, BSR report interval, or HARQ RTTs and numerologies/TTI lengths, BSR report interval, or HARQ RTTs associated with the at least one LCG as described above In an embodiment, the scaling factor may be determined by one of using a TTI length associated with a LCG to divide a reference TTI length; or using a HARQ RTT associated with a LCG to divide a reference HARQ RTT length as described above.

In an embodiment where a logical channel of a LCG maps to more than one numerology/TTI duration with different HARQ RTTs, the network device may use the longest HARQ RTT of the different HARQ RTTs to divide the reference HARQ RTT length to obtain the scaling factor as described above.

In an embodiment, at least one of the respective BS tables may be generated by using a subset of the table entries of a reference BS table, wherein the number of table entries in the subset may be determined based on the respective number of bits of a BS field. The subset of the table entries may be located at any suitable location in the reference BS table. In addition, the BS size value for some index(es) in the subset may be redefined.

At block 806, the network element may obtain respective BS values for the at least one LCG based on the respective buffer size tables. For example, the network element may obtain the index of BS for a LCG from the BSR and then look up the BS table by using the index to get the BS value for the LCG. The network element can then schedule the terminal device based on the reported buffer status.

Figure 9:
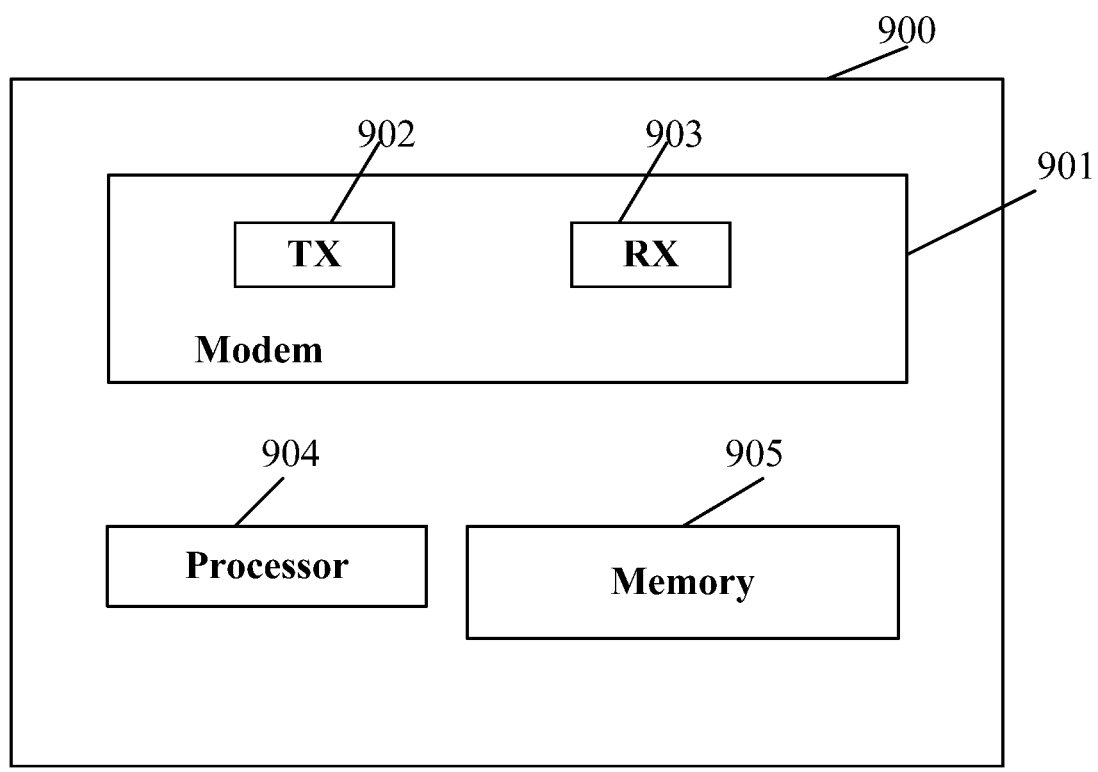
FIG. 9 is a block diagram illustrating an apparatus according to an embodiment of the disclosure.

FIG. 9 depicts an apparatus capable of implementing the methods for BSR as described above, wherein the apparatus may be implemented by or included in the terminal device. As shown in FIG. 9, the apparatus 900 comprises a processing device 904, a memory 905, and a radio modem subsystem 901 in operative communication with the processor 904. The radio modem subsystem 901 comprises at least one transmitter 902 and at least one receiver 903. While only one processor is illustrated in FIG. 9, the processing device 904 may comprises a plurality of processors or multi-core processor(s). Additionally, the processing device 904 may also comprise cache to facilitate processing operations.

Computer-executable instructions can be loaded in the memory 905 and, when executed by the processing device 904, cause the apparatus 900 to implement the above-described methods for BSR. In particular, the computer-executable instructions can cause the apparatus 900 to determine respective buffer size tables for at least one logical channel group (LCG) based on at least one reference buffer size (BS) table; generate the BSR for the at least one LCG based on the respective buffer size tables; and transmit the BSR to a network device, wherein the network device configures a terminal device with the at least one LCG.

Figure 11:
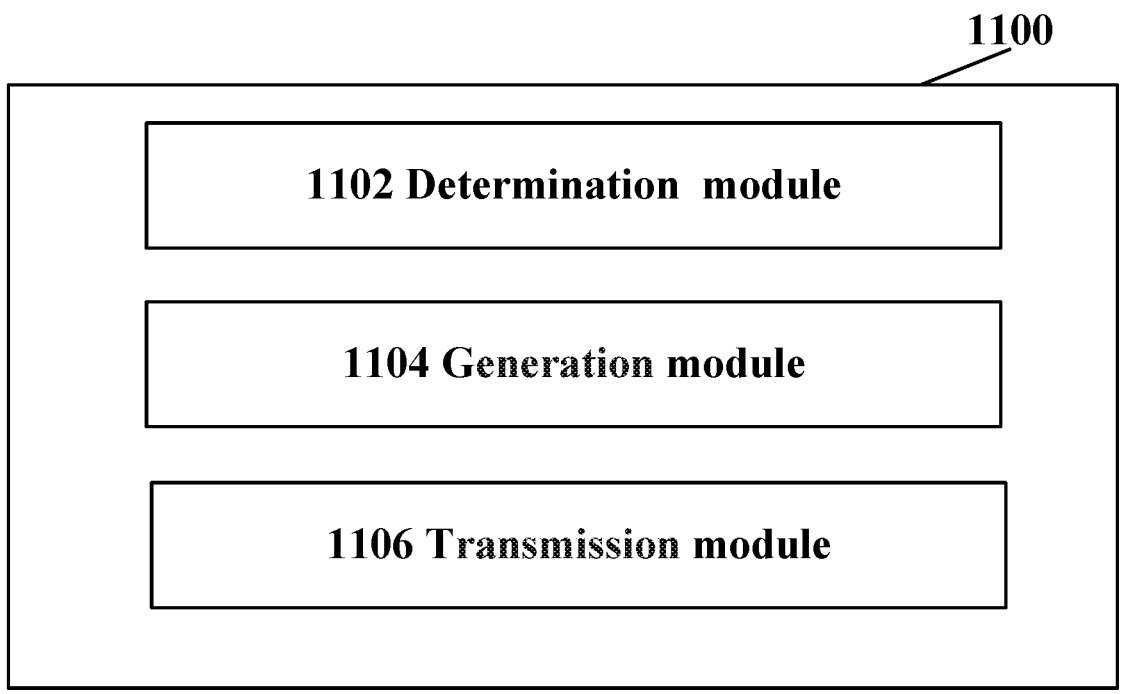
FIG. 11 is a block diagram illustrating an apparatus according to an embodiment of the disclosure.

FIG. 11 depicts an apparatus capable of implementing the methods for BSR as described above, wherein the apparatus may be implemented by or included in the terminal device. As shown in FIG. 11, the apparatus 1100 comprises a determination module 1102 for determining respective buffer size tables for at least one logical channel group (LCG) based on at least one reference buffer size (BS) table; a generation module 1104 for generating the BSR for the at least one LCG based on the respective buffer size tables; and a transmission module 1106 for transmitting the BSR to a network device, wherein the network device configures a terminal device with the at least one LCG.

In an embodiment, the at least one reference buffer size table is generated based on at least one of a maximum uplink transport block size, the maximum number of layers, the maximum number of component carriers (CCs), a maximum carrier bandwidth of each CC supported by the terminal device, a longest round trip time (RTT) length of a hybrid automatic repeat request (HARQ), a fraction of uplink slots in case of time division duplex, BSR report interval, and the number of bits occupied by a buffer size field in the BSR.

In an embodiment, determining respective buffer size tables for the at least one LCG based on at least one reference buffer size table comprises selecting the respective buffer size tables from the at least one reference buffer size table based on a rule; or generating the respective buffer size tables based on the at least one reference buffer size table and respective scaling factors associated with the at least one LCG, or the respective number of bits of a BS field, wherein the rule is prestored in the terminal device or signaled to the terminal device and wherein the respective scaling factors are determined by the terminal device or signaled to the terminal device.

In an embodiment, the at least one reference buffer size table is associated with respective reference numerologies/transmission time-interval (TTI) lengths, BSR report interval, or HARQ RTTs, and the respective scaling factors are determined based on the reference numerologies/transmission time-interval (TTI) lengths, BSR report interval, or HARQ RTTs and respective numerologies/TTI lengths, BSR report interval, or HARQ RTTs associated with the at least one LCG.

In an embodiment, the scaling factor is determined by one of using a TTI length associated with a LCG to divide a reference TTI length; and using a HARQ RTT associated with a LCG to divide a reference HARQ RTT length.

In an embodiment, a logical channel of a LCG maps to more than one numerology/TTI duration with different HARQ RTTs, and using a HARQ RTT associated with a LCG to divide the reference HARQ RTT length comprises: using the longest HARQ RTT of the different HARQ RTTs to divide the reference HARQ RTT length.

In an embodiment, at least one of the respective buffer size tables is generated by using a subset of the table entries of a reference buffer size table, wherein the number of table entries in the subset is determined based on the respective number of bits of a BS field.

In an embodiment, the BSR has a first format comprising a logical channel group ID field and a buffer size field, wherein the size of the logical channel group ID field is configured by the network device based on at least one of the number of LCGs in a network, the number of LCGs used by the mobile terminal, the number of LCGs in a subset of LCGs selected by the network device, wherein the selected LCGs are able to use the first format, and the selection of the subset of LCGs is based on at least one of the LCG/logical channel (LCH) priorities, the volume of available data for the LCG and service type of the LCG.

In an embodiment, the BSR has a second format comprising at least a buffer size field, wherein the size of buffer size field for a specific LCG is configured by the network device based on at least one of a priority for the specific LCG and the data rate requirement for the LCG.

Figure 10:
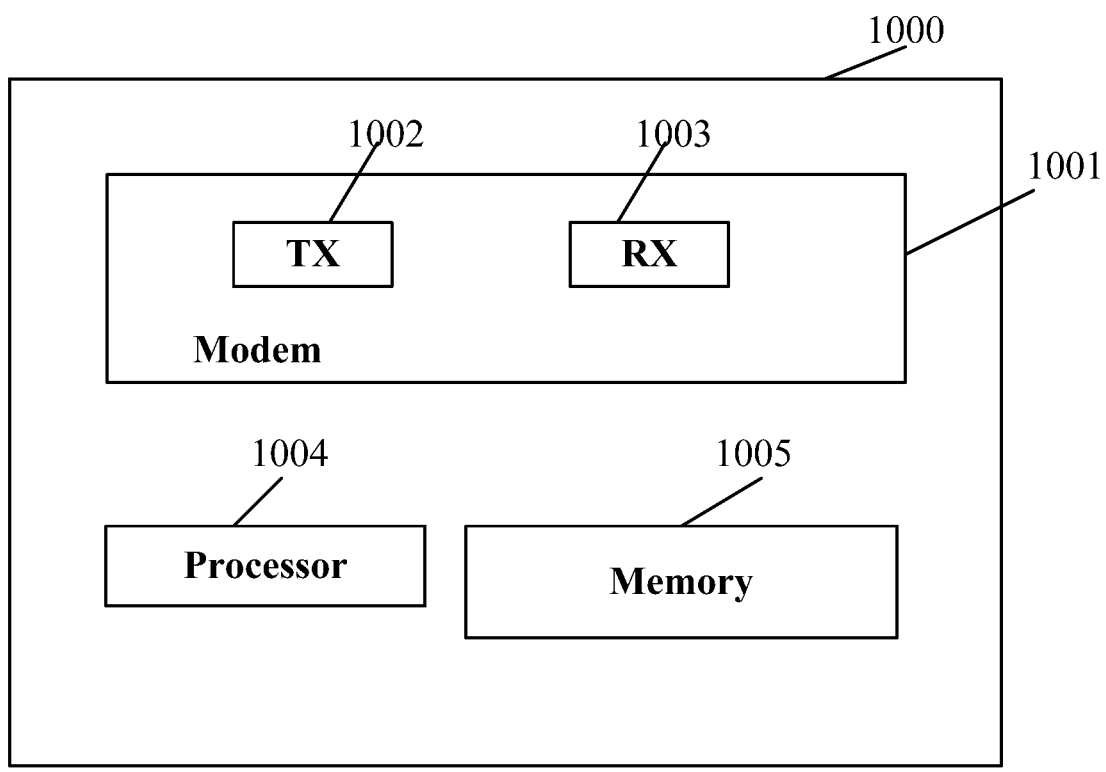
FIG. 10 is a block diagram illustrating an apparatus according to an embodiment of the disclosure

FIG. 10 depicts an apparatus capable of implementing the methods for BSR as described above, wherein the apparatus may be implemented by or included in the network device. As shown in FIG. 10, the apparatus 1000 comprises a processing device 1004, a memory 1005, and a radio modem subsystem 1001 in operative communication with the processor 1004. The radio modem subsystem 1001 comprises at least one transmitter 1002 and at least one receiver 1003. While only one processor is illustrated in FIG. 10, the processing device 1004 may comprises a plurality of processors or multi-core processor(s). Additionally, the processing device 1004 may also comprise cache to facilitate processing operations.

Computer-executable instructions can be loaded in the memory 1005 and, when executed by the processing device 1004, cause the apparatus 1000 to implement the above-described methods for BSR. In particular, the computer-executable instructions can cause the apparatus 1000 to receive a BSR for at least one logical channel group (LCG) from a terminal device; determine respective buffer size (BS) tables for the at least one LCG based on at least one reference BS table; and obtain respective BS values for the at least one LCG based on the respective buffer size tables; wherein a network device configures the terminal device with the at least one LCG.

Figure 12:
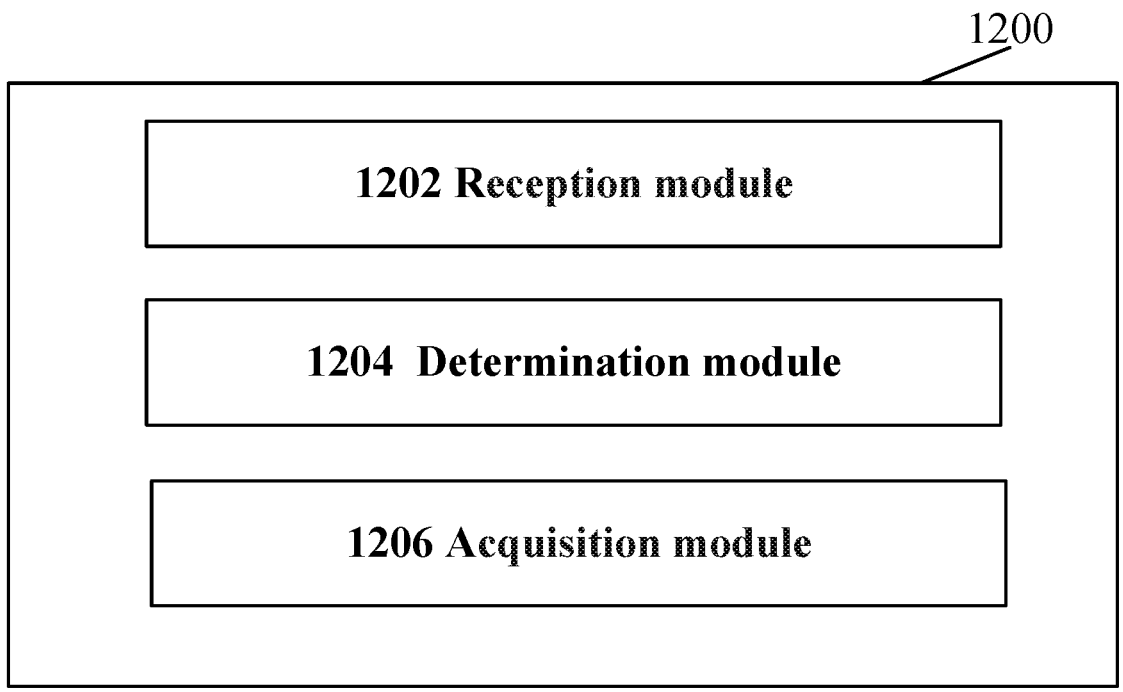
FIG. 12 is a block diagram illustrating an apparatus according to an embodiment of the disclosure.

FIG. 12 depicts an apparatus capable of implementing the methods for BSR as described above, wherein the apparatus may be implemented by or included in the network device. As shown in FIG. 12, the apparatus 1200 comprises a reception module 1202 for receiving a BSR for at least one logical channel group (LCG) from a terminal device; a determination module 1204 for determining respective buffer size (BS) tables for the at least one LCG based on at least one reference BS table; and an acquisition module 1206 for obtaining respective BS values for the at least one LCG based on the respective buffer size tables, wherein the network device 1200 configures the terminal device with the at least one LCG.

In an embodiment, the at least one reference buffer size table is generated based on at least one of a maximum uplink transport block size, the maximum number of layers, the maximum number of component carriers (CCs), a maximum carrier bandwidth of each CC supported by the terminal device, a longest round trip time (RTT) length of a hybrid automatic repeat request (HARQ), a fraction of uplink slots in case of time division duplex, BSR report interval, and the number of bits occupied by a buffer size field in the BSR.

In an embodiment, determining respective buffer size tables for the at least one LCG based on at least one reference buffer size table comprises selecting the respective buffer size tables from the at least one reference buffer size table based on a rule; or generating the respective buffer size tables based on the at least one reference buffer size table and respective scaling factors associated with the at least one LCG, or the respective number of bits of a BS field, wherein the rule is prestored in the terminal device or signaled to the terminal device and the respective scaling factors are determined by the terminal device or signaled to the terminal device.

In an embodiment, the at least one reference buffer size table is associated with respective reference numerologies/transmission time-interval (TTI) lengths, BSR report interval, or HARQ RTTs, and the respective scaling factors are determined based on the reference numerologies/transmission time-interval (TTI) lengths, BSR report interval, or HARQ RTTs and respective numerologies/TTI lengths, BSR report interval, or HARQ RTTs associated with the at least one LCG.

In an embodiment, the scaling factor is determined by one of using a TTI length associated with a LCG to divide a reference TTI length; and using a HARQ RTT associated with a LCG to divide a reference HARQ RTT length.

In an embodiment, a logical channel of a LCG maps to more than one numerology/TTI duration with different HARQ RTTs, and using a HARQ RTT associated with a LCG to divide the reference HARQ RTT length comprises: using the longest HARQ RTT of the different HARQ RTTs to divide the reference HARQ RTT length In an embodiment, at least one of the respective buffer size tables is generated by using a subset of the table entries of a reference buffer size table, wherein the number of table entries in the subset is determined based on the respective number of bits of a BS field.

In an embodiment, the BSR has a first format comprising a logical channel group ID field and a buffer size field, wherein the size of the logical channel group ID field is configured by the network device based on at least one of the number of LCGs in a network, the number of LCGs used by the mobile terminal, the number of LCGs in a subset of LCGs selected by the network device, wherein the selected LCGs are able to use the first format, and the selection of the subset of LCGs is based on at least one of the LCG/logical channel (LCH) priorities, the volume of available data for the LCG and service type of the LCG.

In an embodiment, the BSR has a second format comprising at least a buffer size field, wherein the size of buffer size field for a specific LCG is configured by the network device based on at least one of a priority for the specific LCG and the data rate requirement for the LCG.

According to an aspect of the disclosure it is provided a computer program product comprising at least one non-transitory computer-readable storage medium having computer-executable program instructions stored therein, the computer-executable instructions being configured to, when being executed, cause a network device to operate as described above.

According to an aspect of the disclosure it is provided a computer program product comprising at least one non-transitory computer-readable storage medium having computer-executable program instructions stored therein, the computer-executable instructions being configured to, when being executed, cause a terminal device to operate as described above.

It is noted that any of the components of the network device and terminal device can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

The terms "computer program", "software" and "computer program code" are meant to include any sequences or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.), Binary Runtime Environment (BREW), and the like.

The terms "memory" and "storage device" are meant to include, but not limited to, an electronic, magnetic, optical, electromagnetic, infrared, or semiconductor system, apparatus, or device, or any suitable combination of the foregoing. More specific examples (a non-exhaustive list) of the memory or storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method at a terminal device for wireless communication, comprising:
   generating a buffer size (BS) table for at least one logical channel group (LCG) based on at least one reference BS table and a scaling factor, wherein BS values in the at least one reference BS table are multiplied by the scaling factor to generate the BS table, wherein the at least one LCG is configured by a network device for the terminal device;
   generating a buffer status report (BSR) based on the BS table for the at least one LCG; and
   transmitting the BSR to the network device, wherein the BSR comprising a LCG identity (ID) field and a BS field for corresponding LCG,
   wherein a size of the LCG ID field is configured based on a number of LCGs used by the terminal device.

2. The method according to claim 1, wherein the BS field occupies 5 bits, and the LCG ID field occupies 3 bits.

3. The method according to claim 1, wherein the at least one reference BS table is generated based on at least one of: a maximum uplink transport block size, a maximum number of layers, a maximum number of component carriers (CCs), a maximum carrier bandwidth of each CC supported by the terminal device, a longest round trip time (RTT) length of a hybrid automatic repeat request (HARQ), a fraction of uplink slots in case of time division duplex, BSR report interval, and a number of bits occupied by the BS field in the BSR.

4. The method according to claim 1, wherein the at least one reference BS table is associated with respective reference numerologies/transmission time-interval (TTI) lengths, BSR report interval, or HARQ RTTs, and wherein respective scaling factors are determined based on one of the respective reference numerologies/TTI lengths, BSR report interval, or HARQ RTTs and one of respective numerologies/TTI lengths, BSR report interval, or HARQ RTTs, that is associated with the at least one LCG.

5. The method according to claim 1, wherein selected LCGs are able to use a first format, and a selection of a subset of LCGs is based on at least one of a LCG/logical channel (LCH) priorities, a volume of available data for the LCG and service type of the LCG.

6. A method at a network device for wireless communication, comprising:
configuring a terminal device with at least one logical channel group (LCG);
configuring a buffer status report (BSR) format for the terminal device,
receiving a BSR of the at least one LCG from the terminal device;
determining a buffer size (BS) table based on at least one reference BS table and a scaling factor, wherein BS values in the at least one reference BS table are multiplied by the scaling factor to generate the BS table for the at least one LCG; and
obtaining respective BS values for the at least one LCG based on the BS table,
wherein the BSR format comprising a LCG identity (ID) field and a BS field for corresponding LCG, and wherein a size of the LCG ID field is configured based on a number of LCGs used by the terminal device.

7. The method according to claim 6, wherein the BS field occupies 5 bits, and the LCG ID field occupies 3 bits.

8. The method according to claim 6, wherein the at least one refernce BS table is generated based on at least one of:
a maximum uplink transport block size, a maximum number of layers, a maximum number of component carriers (CCs), a maximum carrier bandwidth of each CC supported by the terminal device, a longest round trip time (RTT) length of a hybrid automatic repeat request (HARQ), a fraction of uplink slots in case of time division duplex, BSR report interval, and a number of bits occupied by the BS field in the BSR.

9. An apparatus at a terminal device for wireless communication, comprising:
a processor; and
a memory containing instructions which, when executed by the processor, cause the apparatus to perform operations to:
generate a buffer size (BS) table for at least one logical channel group (LCG) based on at least one reference BS table and a scaling factor, wherein BS values in the at least one reference BS table are multiplied by the scaling factor to generate the BS table, wherein the at least one LCG is configured by a network device for the terminal device;
generate a buffer status report (BSR) based on the BS table for the at least one LCG; and
transmit the BSR to the network device, wherein the BSR comprising a LCG identity (ID) field and a BS field for corresponding LCG,
wherein a size of the LCG ID field is configured based on a number of LCGs used by the terminal device.

10. The apparatus according to claim 9, wherein the BS field occupies 5 bits, and the LCG ID field occupies 3 bits.

11. The apparatus according to claim 9, wherein the at least one reference BS table is generated based on at least one of:
a maximum uplink transport block size, a maximum number of layers, a maximum number of component carriers (CCs), a maximum carrier bandwidth of each CC supported by the terminal device, a longest round trip time (RTT) length of a hybrid automatic repeat request (HARQ), a fraction of uplink slots in case of time division duplex, BSR report interval, and a number of bits occupied by the BS field in the BSR.

12. The apparatus according to claim 9, wherein the at least one reference BS table is associated with respective reference numerologies/transmission time-interval (TTI) lengths, BSR report interval, or HARQ RTTs, and wherein respective scaling factors are determined based on one of the respective reference numerologies/TTI lengths, BSR report interval, or HARQ RTTs and one of respective numerologies/TTI lengths, BSR report interval, or HARQ RTTs, that is associated with the at least one LCG.

13. The apparatus according to claim 9, wherein selected LCGs are able to use a first format, and a selection of a subset of LCGs is based on at least one of a LCG/logical channel (LCH) priorities, a volume of available data for the LCG and service type of the LCG.

14. An apparatus at a network device for wireless communication, comprising:
a processor; and
a memory containing instructions which, when executed by the processor, cause the apparatus to perform operations to:
configure a terminal device with at least one logical channel group (LCG);
configure a buffer status report (BSR) format for the terminal device;
receive a BSR of the at least one LCG from the terminal device;
determine a buffer size (BS) table based on at least one reference BS table and a scaling factor, wherein BS values in the at least one reference BS table are multiplied by the scaling factor to generate the BS table for the at least one LCG; and
obtain respective BS values for the at least one LCG based on the BS table,
wherein the BSR format comprising a LCG identity (ID) field and a BS field for corresponding LCG, and wherein a size of the LCG ID field is configured based on a number of LCGs used by the terminal device.

15. The apparatus according to claim 14, wherein the BS field occupies 5 bits, and the LCG ID field occupies 3 bits.

16. The apparatus for wireless communication according to claim 14, wherein the at least one reference BS table is generated based on at least one of:
a maximum uplink transport block size, a maximum number of layers, a maximum number of component carriers (CCs), a maximum carrier bandwidth of each CC supported by the terminal device, a longest round trip time (RTT) length of a hybrid automatic repeat request (HARQ), a fraction of uplink slots in case of time division duplex, BSR report interval, and a number of bits occupied by the BS field in the BSR.

* * * * *

UNITED STATES PATENT AND TRADEMARK OFFICE
CERTIFICATE OF CORRECTION

PATENT NO. : 11,528,637 B2
APPLICATION NO. : 16/651361
DATED : December 13, 2022
INVENTOR(S) : Liu et al.

It is certified that error appears in the above-identified patent and that said Letters Patent is hereby corrected as shown below:

On the Title Page

On Page 2, item (56), under "OTHER PUBLICATIONS", in Column 1, Line 5, delete "Beriin," and insert -- Berlin, --, therefor.

On Page 2, item (56), under "OTHER PUBLICATIONS", in Column 2, Line 31, delete "No" and insert -- No. --, therefor.

In the Specification

In Column 9, Line 52, delete "4-8" and insert -- 4~8 --, therefor.

In Column 20, Line 9, delete "Environment" and insert -- Environment for Wireless --, therefor.

In Column 20, Line 26, delete "(ASICS)," and insert -- (ASICs), --, therefor.

In the Claims

In Column 21, Line 37, in Claim 8, delete "refernce" and insert -- reference --, therefor.

Signed and Sealed this
Second Day of July, 2024

Katherine Kelly Vidal
*Director of the United States Patent and Trademark Office*